(12) United States Patent
Espinosa

(10) Patent No.: US 6,400,069 B1
(45) Date of Patent: Jun. 4, 2002

(54) E-M WAVE GENERATION USING COLD ELECTRON EMISSION

(76) Inventor: Robert Espinosa, 1280 Theresa Ave., Campbell, CA (US) 95008

(*) Notice: Subject to any disclaimer, the term of this patent is extended or adjusted under 35 U.S.C. 154(b) by 0 days.

(21) Appl. No.: 09/121,716

(22) Filed: Jul. 22, 1998

(51) Int. Cl.$^7$ ................................................ H01J 1/30
(52) U.S. Cl. ........................ 313/310; 313/495; 313/311; 313/46
(58) Field of Search ................................. 313/309, 310, 313/311, 363.1, 495, 485, 345 R, 359.1, 362.1, 11, 46; 315/111.71, 5.42, 500, 502, 503, 505

(56) References Cited

U.S. PATENT DOCUMENTS

| | | | |
|---|---|---|---|
| 3,714,486 A | 1/1973 | McCrary | 313/55 |
| 3,735,187 A | 5/1973 | Rogers | 313/55 |
| 3,883,760 A | 5/1975 | Cunningham | 313/55 |
| 4,421,622 A | * 12/1983 | Hollars | 204/192 P |
| 4,958,365 A | 9/1990 | Solval | 378/122 |
| 5,014,289 A | 5/1991 | Rothe | 378/122 |
| 5,068,884 A | 11/1991 | Choe et al. | 378/119 |
| 5,469,490 A | 11/1995 | Golden et al. | 378/122 |
| 5,473,218 A | 12/1995 | Moyer | 313/309 |
| 5,543,684 A | * 8/1996 | Kumar et al. | 313/495 |
| 5,604,401 A | 2/1997 | Makishima | 315/5.37 |
| 5,646,479 A | * 7/1997 | Troxell | 313/309 |

OTHER PUBLICATIONS

Design and Performance of Deflected Beam Electron Bombaroled Semiconductor Amplifiers—IEEE Trans. NED-29 pp 439–447 Apr 93.
Race is on to Develop Blue–Green Diode Laser—Laser Focus World—91–96 Apr 98 Tubes Still Vital to Microwave Systems—Espinosa—MSDH—1993.
Travelling Wave Tubes by J.R. Pierce, Van Nostrand Co., N.Y. 1960.

* cited by examiner

Primary Examiner—Ashok Patel
(74) Attorney, Agent, or Firm—Robert Samuel Smith

(57) ABSTRACT

A device for generating electromagnetic radiation including a cathode and an anode. The output port that is integral with the cathode is an electron emitting sheet of material having a low work function for emitting electrons and for a given thickness has a large transmissivity for transmitting radiation. The anode has a target configuration capable of emitting electromagnetic radiation when irradiated by an electron beam. The cathode sheet is supported by a support layer that is selected to be transmissive to the electromagnetic radiation when the cathode sheet must be thin enough to transmit the radiation but is not thick enough to be self supporting. When the support layer is an insulator, electrical connection is made directly to the cathode sheet or to a conducting layer interposed between the cathode sheet and support layer.

27 Claims, 2 Drawing Sheets

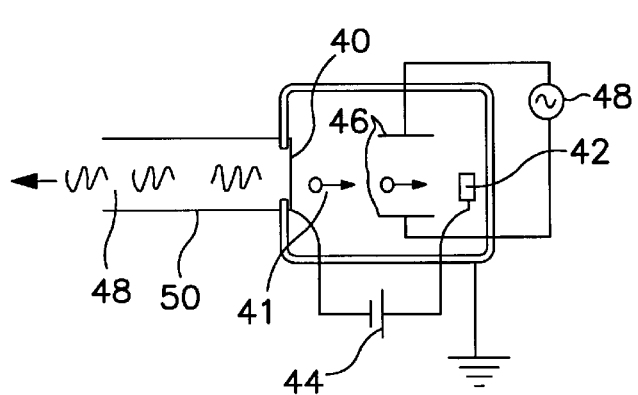
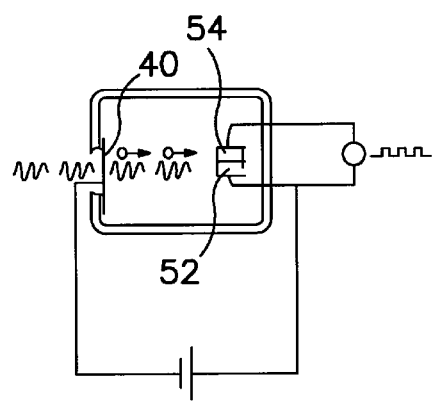
FIG. 5B    FIG. 5C
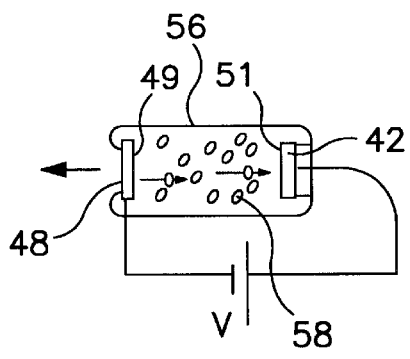
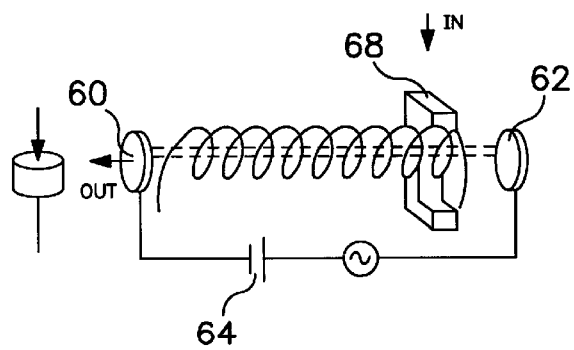
FIG. 5D    FIG. 5E
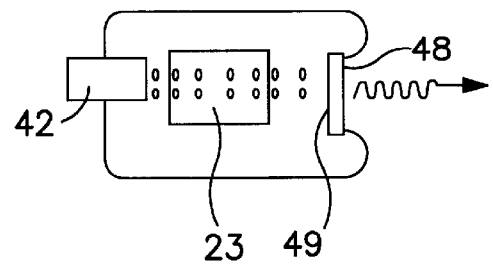
FIG. 5A

E-M WAVE GENERATION USING COLD ELECTRON EMISSION

FIELD OF THE INVENTION

This invention is directed toward generation of electromagnetic waves using electron beams and particularly to electron emission from a cold electrode.

PRIOR ART AND INFORMATION DISCLOSURE

The wavelength of electromagnetic radiation depends on the energy changes associated with the charges, atoms and molecules whose motion is responsible for the generation of the wave. Various techniques are employed to stimulate these energy changes and the parameters of the motion, hence the wavelength, determines the frequency of the resultant radiation.

Waves of broadcast frequencies are generated by current flow in an antenna. Infra red waves are generated by applying heat to a body whose molecules then change their energy state to radiate the infrared waves. X-rays are generated by directing a high energy electron beam against a target.

There has been disclosed x-rays generated by electron beams emitted by a cold cathode. In the early versions of this technique, the electrons ere emitted from the tips of needles or "knife edges" by the very intense fields generated at the tip or blade edge.

For example, U.S. Pat. No. 3,714,486 to McCrary disclosed an electron beam originating from the tip of a needle.

U.S. Pat. No. 3,735,187 to Rogers disclosed a technique for making a very fine tungsten blade wherein an electron beam was generated along the sharp edge of the blade.

U.S. Pat. No. 3,883,760 to Cunningham discloses a field emission x-ray rube having a graphite fabric cathode in which the cathode comprises a concentric array of carbon fabric disks, each having a central aperture and with a needle anode located along the axis of the disks.

U.S. Pat. No. 4,958,365 to Sohval et al discloses a medical imaging device using a plasma cathode flash x-ray source.

U.S. Pat. No. 5,068,884 to Choe et al discloses an x-ray generation system for ultrafine lithography including a center electrode and a peripheral electrode with gas flow holes for generating x-rays from plasma.

U.S. Pat. No. 5,014,289 to Rothe discloses a cold cathode corona discharge to which is applied an accelerating potential forming an electron beam directed at a target to generate x-rays.

U.S. Pat. No. 5,469,490 to Golden et al discloses a cold-cathode x-ray emitter and tube powered by a light weight battery in which all of the high voltage components are contained in a sealed container.

U.S. Pat. No. 5,473,218 to Moyer discloses a flat, cold-cathode electron emitter including a substrate having a flat surface with a low work function electron emission material layer for emitting electrons supported on a substrate, a contact conductive layer with an aperture and an insulating layer, having an aperture coextensive with the first aperture. A conductive gate layer is disposed on the insulating layer. The conductive layer forms the field potential so that emission occurs substantially from the center of the aperture.

U.S. Pat. No. 5,604,401 to Makashima discloses a field emission cold cathode comprising an emitter support structure of two sets of fingers, the fingers of one set interleaving with, coplanar with, but not in electrical contact with the other set. Each set of fingers support a plurality of pointed cones. The base of the cones is supported on the respective array of fingers. Electrons are emitted from the tips of the cones, pointing away from the plane of the array of fingers. The device is used to operate in two current modes in a microwave tube.

X-ray tubes of the type having emission from the tip of a needle or blade are characterized by deterioration of the point or edge due to the intense field at these locations. This construction is useful only in applications where it is desirous to produce narrow beams.

This problem is avoided to some extent by those x-ray sources that use plasma discharge but, again there are limitations imposed by the geometrical arrangement of the tube components in attempting to provide a uniform beam having a broad cross sectional area.

The same limitation applies to tubes that rely on arrays of small apertures. The area around the apertures erodes due to the strong localized fields required.

FIGS. 1A and 1B illustrate a type of x-ray tube construction of the prior art having a housing 11 supporting a window 12 from which an x-ray beam 14 is emitted for purposes where a beam having a large cross sectional area is required. The prior art end window 12 of FIG. 1A consists of a Beryllium disk with the x-ray target material being the anode 16 bonded to the vacuum side of the beryllium disk 12. Electrons 18 are emitted from the hot cathode filament 20 and are accelerated by the high potential between the window 12 and filament 20. X-ray radiation 14 is generated by the electrons 18 striking the target and is transmitted through the target and window assembly.

The x-ray tube windows 12 of FIG. 1 must always be very thin (less than 250 microns) or too much energy is will be absorbed by the window material. Because the windows are very thin they can not tolerate much energy from the electron beam. Accordingly, beam power is limited to five watts or less.

As shown in FIG. 1B, in order to accommodate greater beam power, a separate anode 16 and window 12 are used which greatly increases complexity and cost of the device (x-ray tube).

In the prior art of FIG. 1A, the target layer thickness 16 must be accurately controlled to generate the required x-ray output. If it is too thick, the x-ray energy will be reduced by attenuation in the target material. If the target layer thickness is too thin, electrons will penetrate through the target and generate x-rays from the beryllium window 12 which contaminates the x-ray spectrum. Precisely controlling the penetration of the target 16 also limits the operation of the x-ray tube to a very narrow voltage range. Thus, multiple tubes must be used to provide the coverage of more than a very narrow band within the X-ray spectrum.

SUMMARY OF THE INVENTION

It is an object of this invention to provide an electron emitter integrated with a window which serves as the port through which electromagnetic energy enters or leaves the device.

It is another object that the cross section and intensity of the electron beam be controlled by the electric field at the emitter surface.

It is another object to provide a device for emitting radiation in a broad range of selected frequencies.

It is another object to emit a beam having a large intensity.

It is another object to eliminate the requirement to heat an emitter.

It is another object to provide a device that has a simple construction and is therefore economical to build It is another object to build a source of electromagnetic radiation that has a broad application in many devices.

This invention is directed to structures including a sheet of electron emitting material that is integral to the window and emits electrons in the interior of the device. The electrons are accelerated to an appropriate energy level by a voltage applied to internal electrodes of the device and interact with an internal target structure to produce electromagnetic radiation or perform other useful functions. The radiation passes back through the cathode sheet and is emitted from the side of the cathode sheet opposite the target. The wavelength of the radiation emitted from the target through the window of the device depends upon the applied voltage between the emitter and the anode as well as the nature of the anode.

In the context of this specification, the term "target" or "target structure" is interpreted to mean the component of the device that interacts with the electron stream to generate electromagnetic radiation or other useful output signals of the device. The specific target structure that is selected depends upon the wavelength of the electromagnetic radiation or other useful signals that are to be generated.

In the radio frequency and microwave bands, the target has the form of a circuit propagating electric magnetic energy which is generated by means of interaction of the circuit with the emitted electrons. The propagating circuits may comprise one or more structures including resonators, TWT, EBS, a parametric amplifier, backward wave devices or diode arrays with dimensions appropriate to the frequency of the energy to be exacted.

In the infrared, visible light, and ultra violet ranges, the target may be a solid state laser that is pumped by the emitted electrons. Such targets would comprise materials such as Neodimium, YAG, InGaN/GaN, AlGaN/GaAs, Al G/InP.

To provide radiation at x-ray wavelengths, the target may be a simple metal sheet affixed to or comprising the anode. The wavelength of the radiation emitted from the target through the window of the device depends not only upon the applied voltage between the emitter and the anode but also on the metal which forms the surface of the anode.

X-ray tubes built according to the present invention do not have a limitation on target thickness because the electron beam is incident on the same surface of the anode as the wave emitting surface. Accordingly, the anode can be designed to accommodate electron beams of several hundred watts.

Since the electrons originate from the inside surface of the emitting window and the radiation is generated in a very thick target mounted on the anode, there is no limitation on the range of operating voltage. Therefore, the emitting window of this invention can be applied to generating a broad range of the electromagnetic spectrum extending from x-rays to microwave frequencies.

The advantages of the invention over the prior art reside in the fact that the electron emitter and input and output ports from the device are a single component without any separate electrical connections as opposed to heated cathodes or cold emitter arrays which require additional electrodes, electrical feedthroughs and additional voltages supplies for operation. Simplification of the device and elimination of power supplies results in lower manufacturing cost, reduced power consumption and, in some cases, increase the frequency bandwidth and power output that the devices can provide.

Materials are much more transmissive for electromagnetic waves than for an electron beam. This property provides that, for some applications, the cathode sheet may be thick enough to be self supporting. When an emitting window is required to be large so that so that greater structural support is required, it is an embodiment of the invention to provide a cathode/window that is a composite of two layers. One layer, closest to the target, is made of one material selected because of its ability to emit electrons and is thin enough not to block the electromagnetic wave. This sheet is supported by a thicker sheet selected for its ability to transmit the generated radiation.

In another embodiment of the laminate structure, where both the electron emitting layer and the thicker support layer are poor electrical conductors, a third thin layer of a god electrical conducting material is interposed between the support layer and the electron emitting layer to which electrical contact is made for applying the accelerating potential between the anode and electron emitting cathode.

BRIEF DESCRIPTION OF THE DRAWINGS

FIG. 5A is a schematic diagram of the invenion applied to an energy conversion component representing any one of a number of devices.

FIG. 5B shows principles of the invention applied to a wave amplifier.

FIG. 5C shows priciles of the invention applied to an electron bombarded semiconductor device.

FIG. 5D shows principles of the invention applied to a laser.

FIG. 5E shows principles of the invention applied in the construction of a travelling wve amplifier.

DESCRIPTION OF A BEST MODE

Figure 2:
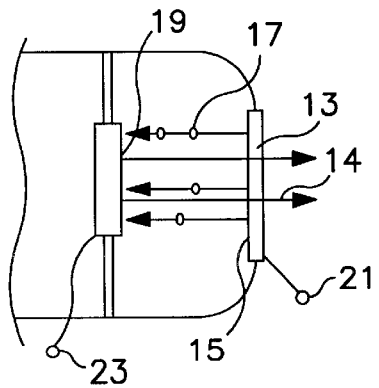
FIG. 2 shows the one-layer generator of electromagnetic waves where the window is made from a cold electron emitting material according to the present invention.

Turning now to a discussion of the drawings, FIG. 2 shows the electromagnetic wave generator of this invention including a "cold" cathode 12 being an electron emitting surface 14 located on the window and facing the target surface 19 of an anode 18. Electrons emitted from surface 14 and accelerated toward the target surface 16 by virtue of an electric field imposed between the cathode and the anode. When the electrons strike the target surface, electromagnetic waves originating from the anode surface travel back through the cathode and are transmitted through the emitting window.

FIG. 2 is a "one-layer" embodiment of the invention which is adapted to the situation where the electromagnetic transmissivity of the material comprising the cathode 13 is sufficiently large enough so that the thickness can be made large enough to enable the emitting window (cathode 13) to be self supporting. Direct electrical connection of the cathode 13 to a potential source (source not shown) is viable. Electrons 17 emitted from surface 15 and strike anode surface 19 by virtue of cold emission due to the application of electrical potential applied between cathode terminal 21 and anode terminal 23. If the transmissivity of the electron emitting material (cathode 13) is very small, then the electron emitting layer 15 of cathode 13 emitting electrons 17 may necessarily be too thin to be self supporting although it can still perform the function of emitting electrons.

Figure 3:
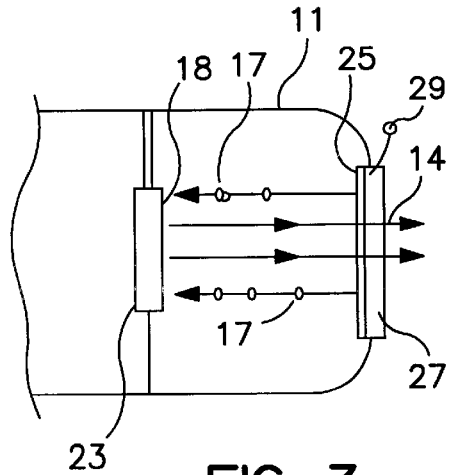
FIG. 3 shows the two-layer generator of electromagnetic waves according to the present invention where a coating of cold electron emitting material is applied to the window.

FIG. 3 shows an embodiment of the invention which overcomes the problem discussed in the preceding paragraph. The cathode-emitting window comprises two layers, the electron emitting layer 25 (which is relatively thin) and a thicker support layer 27 which is selected for its high transmissivity of electromagnetic radiation. In FIG. 3, the support layer 27 also provides electrical contact 29 to the electron emitting layer.

Figure 4:
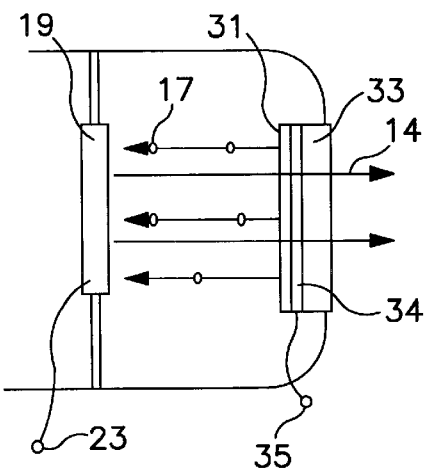
FIG. 4 shows the three-layer generator of electromagnetic waves where a third layer of material is applied to the window to enhance emission from the emitting coating or for added mechanical strength or any other purpose which does not appreciably alter the radiation passing through the window according to the present invention.

In some applications, a support layer that also provides both support to the emitting layer and is highly transmissive, may also be an insulator. FIG. 4 shows an embodiment comprising a thin electron emitting layer 31, a thick (supportive) transmissive layer 33 which is an insulator, and a third layer 34 which is an electrical conductor interposed between the two layers and to which electrical contact 35 is made for applying accelerating potential between anode 19 and cathode 31 to generate an electron beam 17 from the surface 31 by cold emission. The electrons 17, striking the surface of anode 19 generate an x-ray beam 14 that is radiated through window 33.

It should be understood that the above discussion was directed toward the use of the emitting window to generate X-rays but the same general approach may also be used to generate electromagnetic radiation from a very large range of wavelengths.

As a guide in selecting the one layer, (FIG. 2) two layer (FIG. 3), three layer (FIG. 4) for a particular application, it may be noted that the transmissivity of the emitting window generally increases as the wavelength of the radiation is increased. At microwave wavelengths (longer than 1 micrometer, ) electromagnetic waves will pass through insulating materials but will be greatly attenuated by even thin layers of conducting materials (less than 100 Angstroms. Therefore it should be expected that the one layer structure (FIG. 2) is adapted for generating microwave radiation of the spectrum whereas FIG. 3 would be adapted to the x-ray length of the spectrum.

Emitting (cathode) material can be any material which emits electrons in the presence of an electric field. at room temperature. Material characterized as being "wide band gap semiconductors" are useful for this application and include:
n-doped Boron Nitride (NBN);
diamond;
diamond-like carbon (DLC);
composite material which have negative electron affinity (NEA);
materials which exhibit field emission in the presence of a relatively weak electric field;
materials for which electrons in the conduction band are not bound by a surface barrier;
Palladium Silicide;
Tantalum Nitride;
Zirconium Carbide;
Lanthamum Boride.

The windows used for generating X-rays are sheets of material such as insulators, including ceramics, glass, plastics, polymers, or composites for the microwave through ultraviolet wavelength region. Targets for x-ray generation include metals, e.g. Ag, Rh, W, Mo. The higher the atomic number of the metal, the shorter is the wavelength of the generated X-ray.

In the infrared, visible light, and ultra violet ranges, the most appropriate target is a gas solid state laser. Such targets would include materials such as Neodimium, YAG, InGaN/GaN, AlGaN/GaAs, Al GaInP and gases such as $CO_2$, CO, He, Ar, Kr.

FIG. 5A shows the window cathode construction of this invention where feature numbers correspond to the feature numbers of FIGS. 1–4 and the target 23 may be anyone of: a microwave amplifier; reflex klystron; travelling wave tube; electron beam parametric tube; magnetron tube; electron beam semiconductor amplifier; laser FIG. 5B shows the principles of the invention applied to constructing a microwave amplifier. There are shown the window/cathode 40 (source) of electrons 41 accelerated toward the target 42 by the potential from power source 44. Accelerating anode 42A is shown. A pair of deflection plates 46 deflect th beam from the target 42 in response to signal 48. The modulated beam 48 goes into the microwave channel 50 though the window/cathode 40. Variations of the application of the invention in its application to microwave amplifiers that are within the scope of the invention may be suggested by considerin FIG. 5B together with other constructions of microwave amplifiers as described in "Tubes still vital to Microwave Systems" by R. Espinosa published in the Microsystems Design Handbook, pp 126–153, 1983, which is hereby incorporated as reference in this specification.

FIG. 5C shows the principles of the invention applied to EBSD (electron bombarded semiconductor devices. The target is a diode 54 back biased by voltage source 77. The electron beam 78 is generated by cold emission from cathode/window 44, modulated by signal 73 applied to screen 81 and accelerated by potential 75 toward target 54. Current through the diode junction (target) 54 is amplified by the back biased voltage 77 and modulated according to the signal 73. The amplified modulated current generates electromagnetic radiation from antenna 71. The housing 52 also acts as a wave for the genrated signal sgnal, so that the radiated signal is guided by housing 52 back through the cathode/window 40 in accordance with the invention. Construction and operation of devices involving electron bombardment of semiconductor junctions is described in "Electron Bombarded Semiconductor Devices" published in "Advances in Electronics and Physics" vol. 44, pp 221–282 Academic Press, 1977.

FIG. 5D shows the principles of the invenion applied to a lasing operation. There are shown the cathode/window that emits electrons by cold cathode discharge by virtue of a potential V applied between the cathode 48 and anode 42. The anode surface 51 facing the cathode 48 is a reflecting surface and the cathode surface 49 facing the anode 42 is also a reflecting surface with slightly less reflecting capability than the reflecting anode surface 51. The housing 546 is a resonant chamber containing gaseous lasing molecules 58, e.g., a mixture of nitrogen and carbon dioxide. The electron stream from the cathode 48 excites gas molecules and thereby generating electromagnetic waves when the gas molecules relax that are directed toward the cathode/window 48. The waves set up resonance in the cavity from the gas which passes through the window as a laser beam. Construction and operation of laser is described in "High Temperature Stimulated Emission in Optically Pumped InGaN/GaN Multi Quantum Wells, presented at the material Research Society Spring Meeting, F.11, San Francisco, 1998. which is hereby incorporated as reference in this specification.

FIG. 5E shows the principles of the invention applied to a travelling wave amplifier or oscillator of the backward wave type. There is shown an electron emitting cold cathode 60 connected to a target 62 through potential source 64. A signal impresssed on the electron generates a travelling wave in the helix that amplifies the microwave signal input from source 66 and output to receiver 68. further details of the onstruction and operation of a travelling wave tube are presented in "Travelling wave tubes by J. R pierce published by Van Nostrand Co., N.Y. 1960 which is hereby incorporated as reference in this specification.

Reflex Klystrons: Construction and operation of these devices is described in "Reflex Oscillators" Bell System Technical Journal, vol 26, pp 460–681, July 1947, which is hereby incorporated as reference in this specification.

Cross Field and Magnetron Tubes: Construction and operation of these devices are described in "Cross Field Microwave Devices" by E. Okress, published in the Academic Press., N.Y. 1961.

Figure 6:
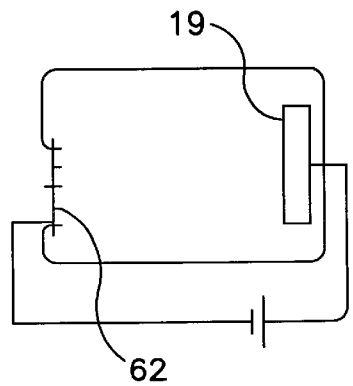
FIG. 6 shows a cathode of this invention being an array of semiconductor tips.

FIG. 6 shows another embodiment of the invention in which the cathode is an array of semiconductor tips. Such tips may be made of, e.g., Si, Mo, diamond, carbon. The tips are arrayed on a thin backing sheet providing that radiation, generated by electrons emitted from the tips and striking the anode, pass back between the tips and radiate from the "window side" of the array.

The characteristics which are common to all of these devices are:

(1) their operaion is based on interaction between an electron stream and electromagnetic waves;

(2) there exists a mode of operation in which the growth of the elctromagnetic waves or stimulated radiation can be in the opposite direction to the electron flow.

What has been described is a device comprising a structure which will emit electrons from one or more surfaces and is substantially transparent to electromagnetic radiation having a wavelength in the range from $10^{-1}$ to $10^{-11}$ meters. These wavelengths include the microwave, infrared, visible, ultraviolet and Xray bands. The device of this invention can be used in many applications covering a broad band of wavelengths. These include, for example, as a laser pump, a microwave amplifier, X-ray spectrometry. When applied to the generation of X-rays, the device overcomes disadvantages of the prior art including the restriction to limits on the range of thickness of the target material.

Figure 1A:
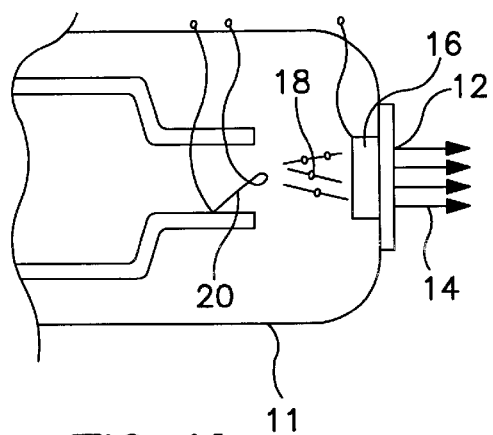
FIG. 1A shows an x-ray tube having an emitter window with an x-ray target mounted on the window according to the prior art.
Figure 1B:
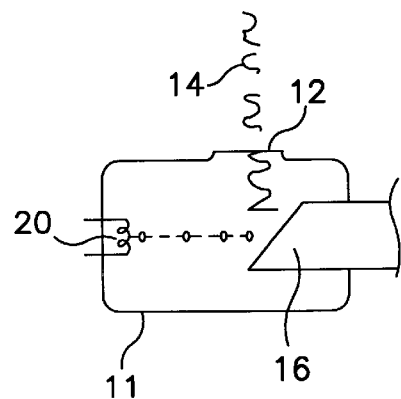
FIG. 1B shows an x-ray tube having an emitter window with an x-ray target mounted separate from the window according to the prior art.

Variations and modifications of the invention may be suggested by studying the drawings and reading the specification that are within the scope of the invention. For example, as shown in FIG. 1, the target may be water cooled to permit use of an electron beam having greater power than otherwise.

I therefore wish to define the scope of my invention by the appended claims:

What is claimed is:

1. A device for generating electromagnetic waves which comprises:

a cold cathode means having a surface for emitting electrons and being a sheet of cathode material;

an anode means for receiving said electrons and emitting electromagnetic waves in response to receiving said electrons;

support means for supporting said anode means and cathode means with said anode means operably arranged to interact with electrons emitted from said sheet of cathode material;

positive terminal means adapted for connecting said anode means to a positive terminal of a voltage source;

negative terminal means adapted for connecting said cathode means to a negative terminal of said voltage source;

said material of said cathode means being selected to provide that when a voltage is applied between said positive and negative terminals, an electron beam is emitted from said electron emitting surface facing said anode means and is accelerated toward said anode means; and said material of said cathode means also selected to provide that electromagnetic waves generated from said anode means will be transmitted through said cathode means in a direction away from said anode means whereby said cathode means provides an exit window from said device for said electromagnetic waves.

2. The device of claim 1 wherein said anode means comprises at least one electrode.

3. The device of claim 1 which comprises:

a voltage source having terminals for connection to said terminal means.

4. The device of claim 1 wherein said support means comprises a support sheet laminated to said sheet of cathode material.

5. The device of claim 4 wherein said support sheet is electrically conducting and said negative terminal is connected to said support sheet.

6. The device of claim 4 comprising;

said support sheet being electrically insulating;

an electrically conducting layer interposed between said support sheet and said sheet of cathode material.

7. The device of claim 1 wherein said emitter material is selected from a group of materials that consists of n-doped nitrides, diamond, diamond-like-carbon.

8. The device of claim 1 wherein said emitter material is selected from a group of materials having a negative electron affinity.

9. The device of claim 1 wherein said emitter material is selected from a group of wide band semiconductor materials.

10. The device of claim 1 wherein said cathode material is Beryllium.

11. The device of claim 4 wherein said support sheet comprises an insulator.

12. The device of claim 4 wherein said support sheet comprises a material selected from a group of materials which consists of ceramic, glass, plastic, polymers, single crystal diamond and aluminum oxide.

13. The device of claim 1 which comprises a housing means for enclosing said cathode means and said anode means in a vacuum.

14. The device of claim 1 comprising means for cooling said anode means.

15. The device of claim 14 wherein said means for cooling comprises means for circulating one of air and water.

16. The device of claim 1 wherein said material of said cathode material is selected from the group of materials characterized as being broadgap semiconductors.

17. The device of claim 1 wherein said anode means comprises a propagating circuit means for propagating electromagnetic waves.

18. The device of claim 17 wherein said propagating circuit is selected from a group of propagating circuits which consists of a microwave amplifier; reflex klystron; travelling wave tube; electron beam parametric tube; magnetron tube; electron beam semiconductor amplifier.

19. The device of claim 1 wherein said anode means comprises a laser.

20. The device of claim 1 wherein said anode means comprises anode material having a target surface facing said electron emitting surface.

21. The device of claim 20 wherein said anode material comprises an insulator material.

22. The device of claim 21 wherein; said insulator comprises at least one insulator material selected from a group of insulator materials which consists of a ceramic, glass, and a plastic and said insulator material is selected in operable combination with said voltage to generate electromagnetic radiation having a wavelength within a range of microwave through ultraviolet radiations.

23. The device of claim 1 wherein said anode means comprises a metal and said voltage is operably selected in combination with said metal to generate Xray radiation.

24. The device of claim 23 wherein said metal is selected from a group of metals which consists of Ag, Rh, W, Mo, Pd, Ti, Cu.

25. The device of claim 1 which further comprises a means positioned between said cathode means and said anode means for amplifying energy from said radiation generated at said anode.

26. The device of claim 25 wherein said means for amplifying energy comprises a lasing medium.

27. The device of claim 1 which further comprises a means positioned between said cathode means and said anode means for applying a modulating signal to said electron beam whereby energy from said radiation generated at said anode is modulated according to said modulating signal.

* * * * *